United States Patent
Doremus et al.

[11] Patent Number: 6,161,670
[45] Date of Patent: Dec. 19, 2000

[54] FRICTION CLUTCH WITH WEAR TAKE-UP DEVICE, IN PARTICULAR FOR MOTOR VEHICLE

[75] Inventors: Olivier Doremus, Izel lez Hameau; Jean-Luc Travers, Andechy, both of France

[73] Assignee: Valeo, Paris, France

[21] Appl. No.: 09/242,318

[22] PCT Filed: Jun. 17, 1998

[86] PCT No.: PCT/FR98/01277

§ 371 Date: Sep. 23, 1999

§ 102(e) Date: Sep. 23, 1999

[87] PCT Pub. No.: WO98/58187

PCT Pub. Date: Dec. 23, 1998

[30] Foreign Application Priority Data

Jun. 17, 1997 [FR] France ................................. 97 07482

[51] Int. Cl.[7] ........................................... F16D 13/75
[52] U.S. Cl. ........................... 192/70.25; 192/111 A
[58] Field of Search ........................ 192/70.25, 111 A

[56] References Cited

U.S. PATENT DOCUMENTS

| | | | |
|---|---|---|---|
| 3,752,286 | 8/1973 | Sink | 192/11 A |
| 4,099,604 | 7/1978 | Higgerson | 192/111 A |
| 4,228,883 | 10/1980 | Palmer | 192/111 A |
| 5,029,687 | 7/1991 | Asada et al. | 192/111 A |
| 5,090,536 | 2/1992 | Asada | 192/111 A |
| 5,251,737 | 10/1993 | Flotow et al. | 192/111 A |
| 5,320,205 | 6/1994 | Kummer et al. | 192/70.25 |
| 5,816,379 | 10/1998 | De Briel et al. | 192/70.25 |
| 5,887,689 | 3/1999 | Young | 192/70.25 |
| 5,937,986 | 8/1999 | Schubert | 192/70.25 |
| 5,971,125 | 10/1999 | Doremus et al. | 192/70.25 |
| 5,994,157 | 8/1999 | Blard et al. | 192/70.25 X |

FOREIGN PATENT DOCUMENTS 2739159  3/1997  France .

OTHER PUBLICATIONS

International Search Report for PCT/FR98/01277.

*Primary Examiner*—Rodney H. Bonck
*Assistant Examiner*—Saúl Rodriguez
*Attorney, Agent, or Firm*—Liniak, Berenato, Longacre & White

[57] ABSTRACT

The invention concerns a friction clutch comprising a reaction plate, a friction disk, bearing at its external periphery friction linings, a pressure plate (1), a cover (2) fixed on the reaction plate, elastic means operating axially (3) between the cover and the pressure plate (1) through support means (14), a wear take-up device including ramp means (11) axially set between the support means (14) and the pressure plate (1), said ramps (15) being adapted to co-operate with counter-ramp means (4). Said wear take-up device further comprises a toothing (18) with which a worm (13) co-operates, the counter-ramp means (4) being integral with said toothing (18) and means (20) driving the worm (13) in rotation being provided, the worm (13) and the means (20) driving the worm (13) in rotation being borne by a support (12) integral with the ramp means (11).

28 Claims, 7 Drawing Sheets

FRICTION CLUTCH WITH WEAR TAKE-UP DEVICE, IN PARTICULAR FOR MOTOR VEHICLE

The present invention concerns a friction clutch, in particular for a motor vehicle, and relates more particularly to a clutch equipped with a device compensating for wear due notably to the wear on the friction linings, the said device, hereinafter referred to as the wear take-up device, operating progressively as the said linings wear.

A conventional friction clutch generally has a reaction plate, possibly in two parts in order to form a damping flywheel, fixed with respect to rotation to a first shaft, usually a driving shaft such as the crankshaft of the internal combustion engine, and supporting, through its external periphery, a cover to which at least one thrust plate is attached.

The thrust plate is fixed with respect to rotation to the cover and reaction plate whilst being able to move axially under the action of controlled axially acting elastic means, generally a metal diaphragm bearing on the cover, whilst a friction disc, carrying friction linings at its external periphery, fixed with respect to rotation to a shaft, usually a driven shaft such as the input shaft of the gearbox, is interposed between the thrust plate and the reaction plate so as to be clamped between them when the clutch is in the engagement position. The diaphragm controls the axial movement of the thrust plate when it is actuated by a clutch release bearing.

During the service life of such a clutch, the friction linings and the counter-materials, the thrust plate and the reaction plate, wear, which causes a variation in the position of the thrust plate and the positions of the axially acting elastic means and of the clutch release bearing, resulting in a variation in the clamping force between the friction disc on the one hand and the thrust and reaction plates on the other hand, because of the changes in the working conditions of the diaphragm, and the force necessary to declutch is affected thereby. By providing such a clutch with a wear take-up device, these drawbacks are avoided, the diaphragm, and the clutch release bearing, usually in constant abutment against the diaphragm, occupying the same position when the clutch is in the engagement position.

A friction clutch has been proposed, notably in French patent application FR-A-2 753 503 filed on Sep. 17, 1996 under the number 96-11297, in particular for a motor vehicle, of the type having a reaction plate intended to be fixed with respect to rotation to a driving shaft, a friction disc carrying friction linings at its external periphery, intended to be fixed with respect to rotation to a driven shaft, a thrust plate, a cover fixed to the reaction plate, axially acting elastic means acting between on the one hand the cover and on the hand the thrust plate by means of abutment means, the thrust plate being fixed with respect to rotation to the cover whilst being able to move axially with respect to it and being subjected to the action of elastic return means returning the thrust plate axially towards the cover, the said clutch also having a wear take-up device comprising circumferentially disposed ramp means, placed axially between the abutment means and the thrust plate, the said ramps being adapted to cooperate with counter-ramp means, the said wear take-up device also comprising teeth with which a tangentially disposed worm cooperates, one of the two members, the ramp means and the counter-ramp means, being fixed to the said teeth, means for rotatably driving the worm being provided, made operational by the wear on the friction linings when the clutch is engaged, the worm and the means of rotatably driving the worm being carried by a support.

According to the said French application, a clutch of the above type comprises ramp means adapt to be driven in rotation by virtue of the teeth which they carry at their periphery, whilst the worm and the means of driving the worm in rotation are carried by the support, here fixed to the cover.

Such an arrangement functions well; however, it requires a well adapted cover; moreover, the axially acting elastic means consist of a diaphragm which controls the means of rotatably driving the worm and which is specific.

The aim of the present invention is to mitigate these drawbacks and its object is a clutch of the above type which the cover is only slightly modified compared with the cover of a clutch which is not equipped with a wear take-up device; moreover, when the axially acting elastic means consist of a diaphragm, the latter is a conventional diaphragm, even when the means of rotatably driving the worm are controlled by the diaphragm; in addition, the number of parts is reduced.

According to the invention, a clutch of the above type is characterised by the fact that the support which carries the worm and the means of rotatably driving the worm is fixed to the ramp means.

Preferably, the axially acting elastic means consist of a diaphragm.

Advantageously, the ramp means consist of an annulus having axially, on one side, ramps which are inclined and distributed circumferentially and, on the other hand, the abutment means.

Preferably, the counter-ramp means consist of studs or ramps intended to cooperate with the ramps of the ramp means.

Advantageously, the ramp means are centred with respect to the thrust plate.

Preferably, the worm is mounted so as to be able to move along its axis whilst being subjected to the action of an elastic so-called take-up means.

Between two taking-up operations, the load on the elastic take-up means is caused to increase with the wear on the friction linings; consequently the said axial movement is obtained through the action of the elastic take-up when its load is sufficiently high to overcome the friction force due to the axial force coming from the elastic return means to which the said ramp means are subjected, the clutch being disengaged.

Advantageously, the travel of the thrust plate is limited in the direction of disengagement in order to release the ramp means from the axial force coming from the elastic return means.

Preferably, the elastic take-up means is a helical spring surrounding a shaft which carries the worm.

Advantageously, the means of rotatably driving the worm consist of a ratchet wheel fixed with respect to rotation to the worm.

Preferably, the shaft carrying the worm and the helical spring is supported by the support.

Advantageously, the means of rotatably driving the worm are controlled by means of a control tongue.

Advantageously, the travel of the control tongue, relatively to the ratchet wheel, during the disengagement operation, is limited by a so-called control stop.

Preferably, the worm and ratchet wheel are cut in a single piece.

Preferably the teeth on the ratchet wheel are produced so that, during a minimum disengagement travel defined by design, and disregarding the control stop, the end of the control tongue jumps a tooth.

Advantageously, the control stop is disposed so that, during the disengagement travel with new linings, the end of the control tongue does not jump a tooth, or is at the limit of jumping a tooth.

Advantageously, if the wear has been sufficient for the ratchet wheel to have sufficiently turned so that, on return, the control tongue has jumped a tooth, the control tongue, during the engagement operation, causes the ratchet wheel to turn.

Preferably the counter-ramp means and the teeth are integral with the thrust plate, the ramp means being free with respect to rotation.

Advantageously, the support carrying the worm and the means of rotatably driving the worm is fixed to the ramp means radially below the latter, that is to say inside the ramp means.

Advantageously, the teeth are placed radially below the worm with which it cooperates.

Preferably, the control tongue is carried by the support.

Advantageously, the means of rotatably driving the worm are controlled by the diaphragm.

Preferably, the support equipped with the worm, the ratchet wheel, the control tongue, the spring and the shaft constitutes a subassembly ready to be installed; during its installation, an axial adjustment is possible by virtue of oblong holes in the support.

Advantageously, the clutch is of the pulled type.

Preferably, the ramp means are fixed with respect to rotation to the thrust plate whilst being able to move axially with respect to it, whilst the counter-ramp means are produced in the form of an annulus mounted so as to rotate freely with respect to the thrust plate and disposed axially between the latter and the ramp means.

Preferably, the teeth are carried by the counter-ramp means.

Advantageously, the support carrying the worm and the means of rotatably driving the worm is fixed to the ramp means radially above these, that is to say outside the ramp means.

Preferably, the teeth are placed radially above the counter-ramp means.

Advantageously, the control tongue is carried by the cover.

Preferably, the support equipped with the worm, the ratchet wheel, the spring and the shaft constitute a subassembly ready to be installed.

Advantageously, the clutch is of the pushed type, the diaphragm being fixed to the cover by small columns.

In order to give a better understanding of the object of the invention, a description will now be given, by way of purely illustrative and non-limitative examples, of embodiments depicted in the accompanying drawings, in which:

FIGS. 8 to 10 depict the subassembly consisting of the support, the worm, the ratchet wheel, the spring, the shaft and the elastic member.

In these figures, the diaphragm clutch 3, 53 has a hollow-shaped cover 2, 52.

In this case the cover is metallic, being made from pressed plate.

This cover has a base and means for fixing it to a reaction plate, possibly divided in order to form a damping flywheel. The reaction plate is in this case a driving reaction plate.

In the embodiments in FIGS. 1 to 14, the means of fixing the cover consist of a divided axially oriented annular skirt extending a radial flange provided with holes for the passage of members, such as screws, for fixing the cover 2 to the reaction plate.

As a variant, the cover is roughly in the form of a hollow dish and has, at its external periphery, a radial flange forming means of fixing the cover to the reaction plate, the said flange being provided with holes for the passage of members, such as screws, for fixing the cover to the reaction plate.

In the embodiments in FIGS. 1 to 10, the clutch is of the pulled type so that it is necessary to act by pulling on the internal end of the fingers of the diaphragm 3 in order to disengage (declutch) the clutch. The external peripheral part of the Belleville washer of the diaphragm bear, on the base of the cover on a ring, and not referenced, carried by the external periphery of the base of the cover, or in a variant on a dished part provided in the said base. The internal peripheral part of this Belleville washer is in contact with an abutment 14 described below.

In the embodiment in FIGS. 11 to 14, the clutch is of the pushed type, that is to say it is necessary, using a clutch release bearing, not shown, to act by pushing on the internal end of the fingers of the diaphragm 53 in order to disengage (declutch) the clutch. To do this, the base of the cover 52 carries, on the one hand, a primary abutment consisting for example of a dished part produced in the base of the cover at the internal periphery thereof, and, on the other hand, opposite the primary abutment, a secondary abutment in the form of heads of small columns, a rolled ring carried by small columns 58 (FIGS. 11 and 13), or any other means. The diaphragm 53, through the internal periphery of its Belleville washer, is mounted so as to tilt between the said primary and secondary abutments. Through the external periphery of its Belleville washer, it is in contact with abutment areas 54, described below.

Figure 1:
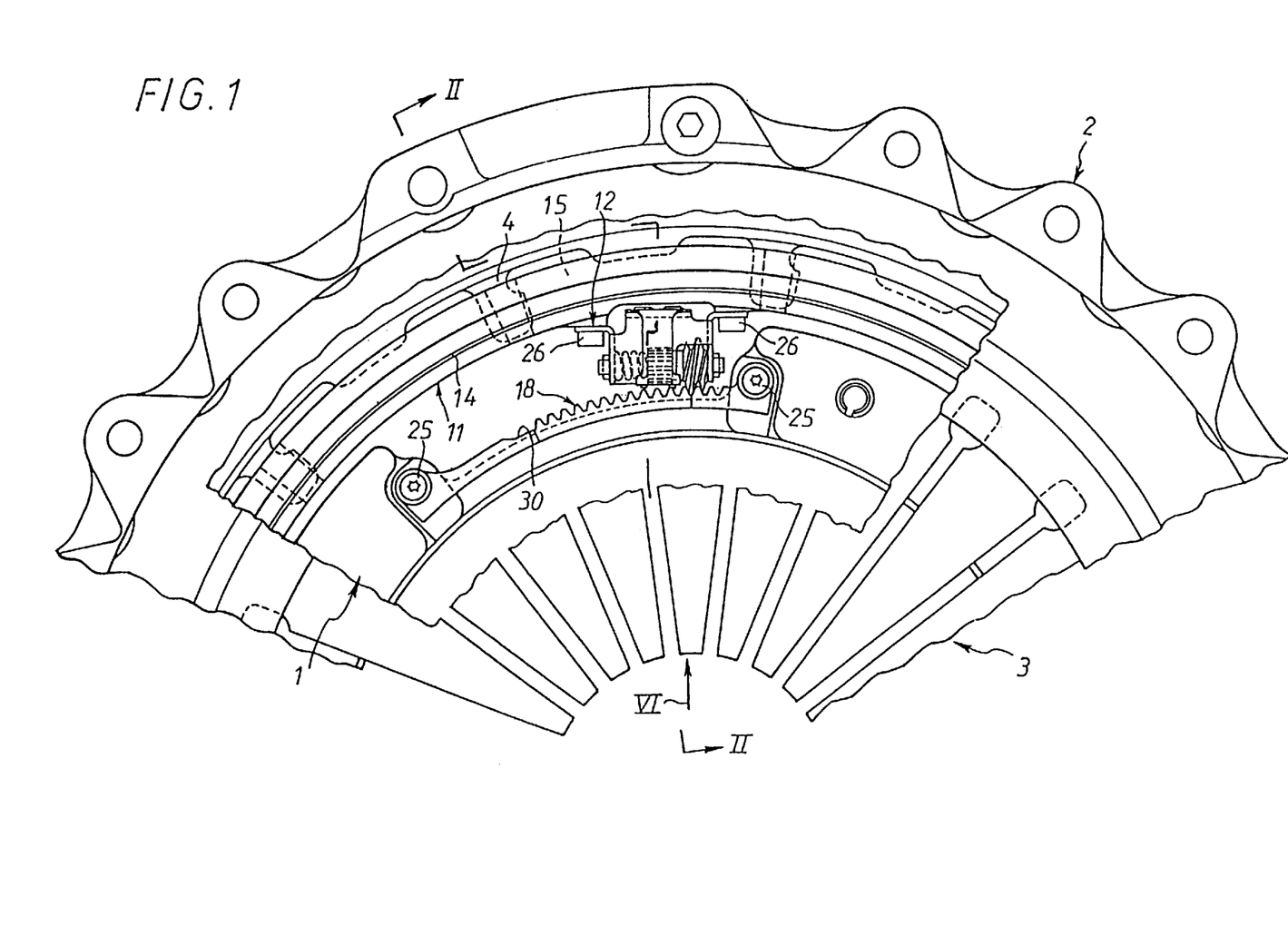
FIG. 1 is a partial plan view, with cut-away parts, of a clutch equipped with a wear take-up device according to the invention, with new linings.
Figure 2:
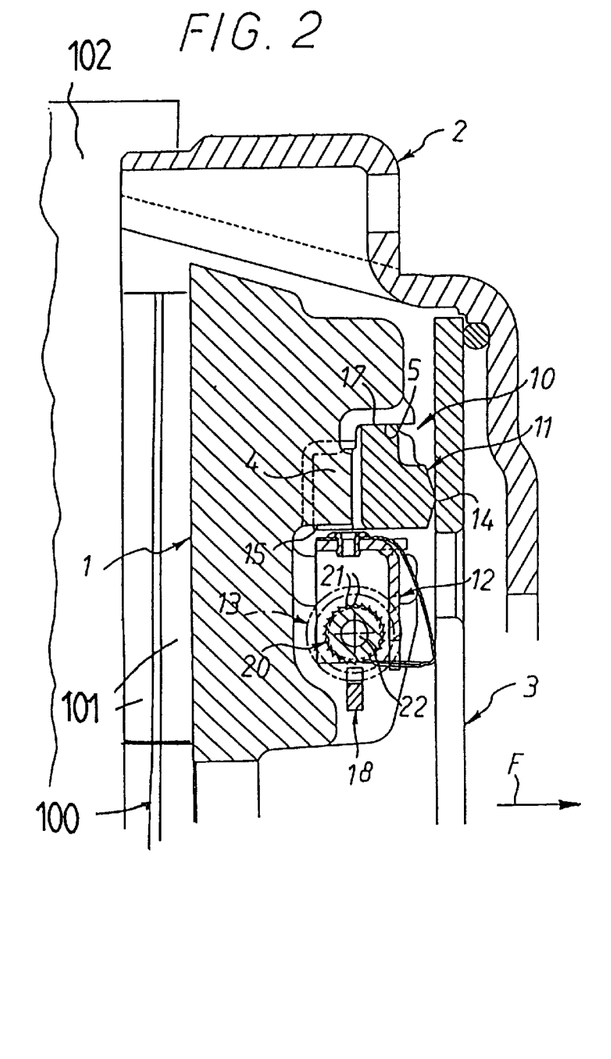
FIG. 2 is a partial view in section of the clutch, along II—II in FIG. 1.

Referring to FIGS. 1 to 10, a friction clutch mechanism can be seen, notably for a motor vehicle, which comprises a thrust plate 1 intended to cooperate with a friction disc depicted schematically at 100 in FIG. 2, carrying et its external periphery friction linings 101, which itself cooperates with a reaction plate 102. The reaction plate is intended to be fixed with respect to rotation to a driving shaft, such as the crankshaft of the internal combustion engine. The friction disc is fixed with respect to rotation to a driven shaft such as the input shaft of the gearbox. The friction disc is in this case a driven friction disc.

The thrust plate 1 is fixed with respect to rotation to a hollow-shaped cover 2 by means of tangential tongues, not visible in the figures, which, being elastic, constitute at the same time means of returning the thrust plate 1 towards the cover 2, here metallic, made from pressed plate.

The thrust plate 1, whilst being fixed with respect to rotation to the cover 2, is therefore able to move axially with respect to the cover 2 under the action of controlled axially acting elastic means, in this case a diaphragm 3 bearing on the cover 2 through its external periphery, the clutch in this case being of the pulled type, the declutching operation being effected by acting on the end of the fingers of the diaphragm 3 in the direction of the arrow F in FIG. 2.

In order, when the clutch is engaged, to hold the axially acting elastic means 3 in a position independent of the wear on the linings of the friction disc and the thrust 1 and reaction plates whose faces, referred to as friction faces, wear in contact with the disc linings, a wear take-up device 10 is provided.

The wear take-up device 10 comprises circumferentially disposed ramp means 11; more precisely, these ramp means 11 consist of an annulus having circumferentially disposed ramps 15; the said annulus also has abutment areas 14 consisting of a top edge centred on the axis of the clutch placed axially outside with respect to the ramps 15.

The thrust plate 1 has, here moulded in one piece, on its face turned towards the base of the cover 2, studs 4 distributed circumferentially at a distance from each other which corresponds to that which circumferentially separates two successive ramps 15, the studs 4 being intended each to cooperate with a ramp 15.

The ramp means 11 are placed axially between the diaphragm 3 and the thrust plate 1 so that the studs 4 receive the ramps 15 and the diaphragm 3 cooperates with the abutment areas 14 which thus constitute the abutment means by means of which the diaphragm 3 acts on the thrust plate 1.

The ramp means 11 have, at their external periphery, a cylindrical wall 17 parallel to the axis of the clutch cooperating with a cylindrical hollow 17 with the same axis which the thrust plate has on its face opposite to the base of the cover 2 so that the ramp means 11 are centred with respect to the thrust plate 1.

The wear take-up device 10 also comprises a ratchet wheel 20 with inclined teeth 21 which is carried by a shaft 22 also carrying a worm 13.

Figure 8:
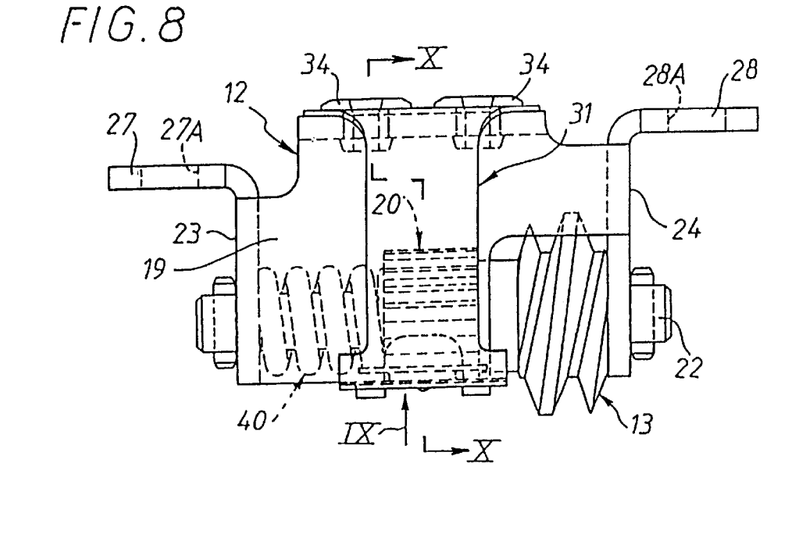
FIG. 8 is a view in the direction of the arrow VIII in FIG. 10 which is a view in section along X—X in FIG. 8.
Figure 9:
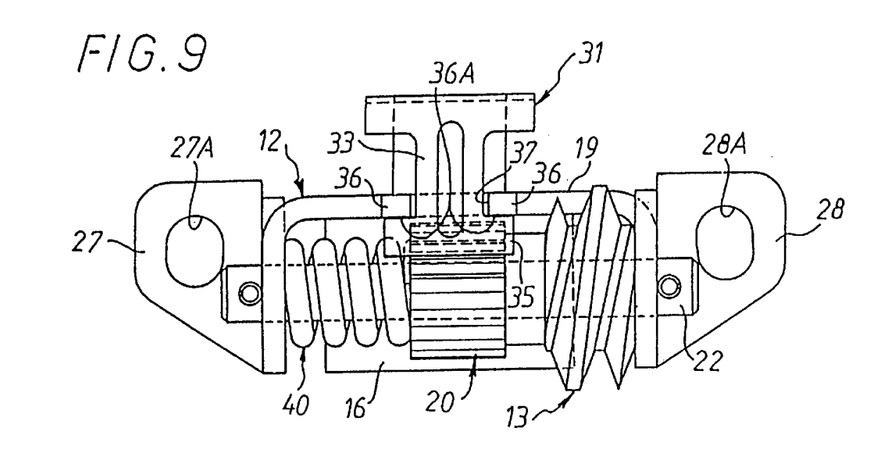
FIG. 9 is a view in section along IX—IX in FIG. 8.
Figure 10:
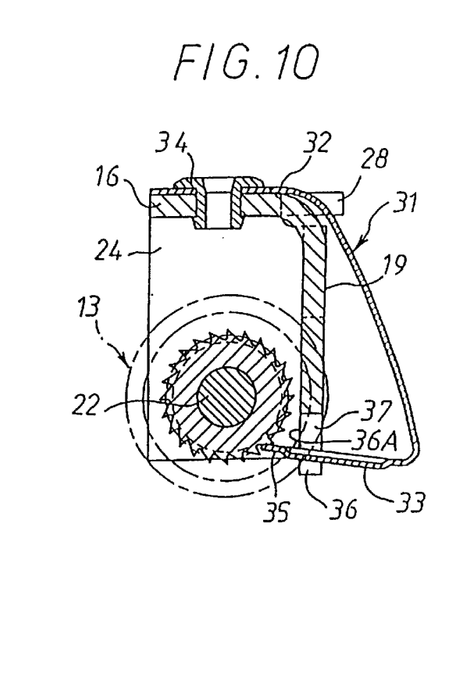

The shaft 22 of the ratchet wheel 20 is carried by a support 12, more clearly visible in FIGS. 8 to 10, made from cropped and bent plate, in the shape of a U having a web 19 and two flanges 23, 24 intended to support the shaft 22; for this purpose, each of the flanges carries a circular hole adapted to the diameter of the shaft 22.

The flanges 23, 24 of the support 12 are extended in L shaped arms 27, 28 moving away from each other perpendicularly to the web 19.

The support 12 is adapted to receive an elastic member 31, here metallic, in the general shape of a C, one end 32 of which is used for fixing, here by rivets 34, the elastic member 31 to a return 16 on the web 19 of the support 12, this return 16 here extending perpendicularly to the web 19 and in line with the arm 28. The other end 33, in the shape of a T, of the elastic member 31 carries at its end a control tongue 35.

When the elastic member 31 and the ratchet wheel 20 are mounted on the support 12, the control tongue 35 cooperates with a tooth root on the ratchet wheel 20; a helical compression spring 40 is placed between the ratchet wheel 20 and the flange 23 of the support 12, whilst being coiled around the shaft 22; the worm 13 and ratchet wheel 20 are here cut from the same piece; as can be seen, the support 12 equipped with this same piece, with the elastic member 31, with the spring 40 and with the shaft 22 constitutes a subassembly ready to be installed.

The helical spring 40 constitutes the elastic take-up means, as described below.

The thread and pitch of the worm 13 are adapted to teeth 18; the worm 13 is caused to cooperate with the teeth 18 under the conditions which will be described below.

Figures 6, 7:
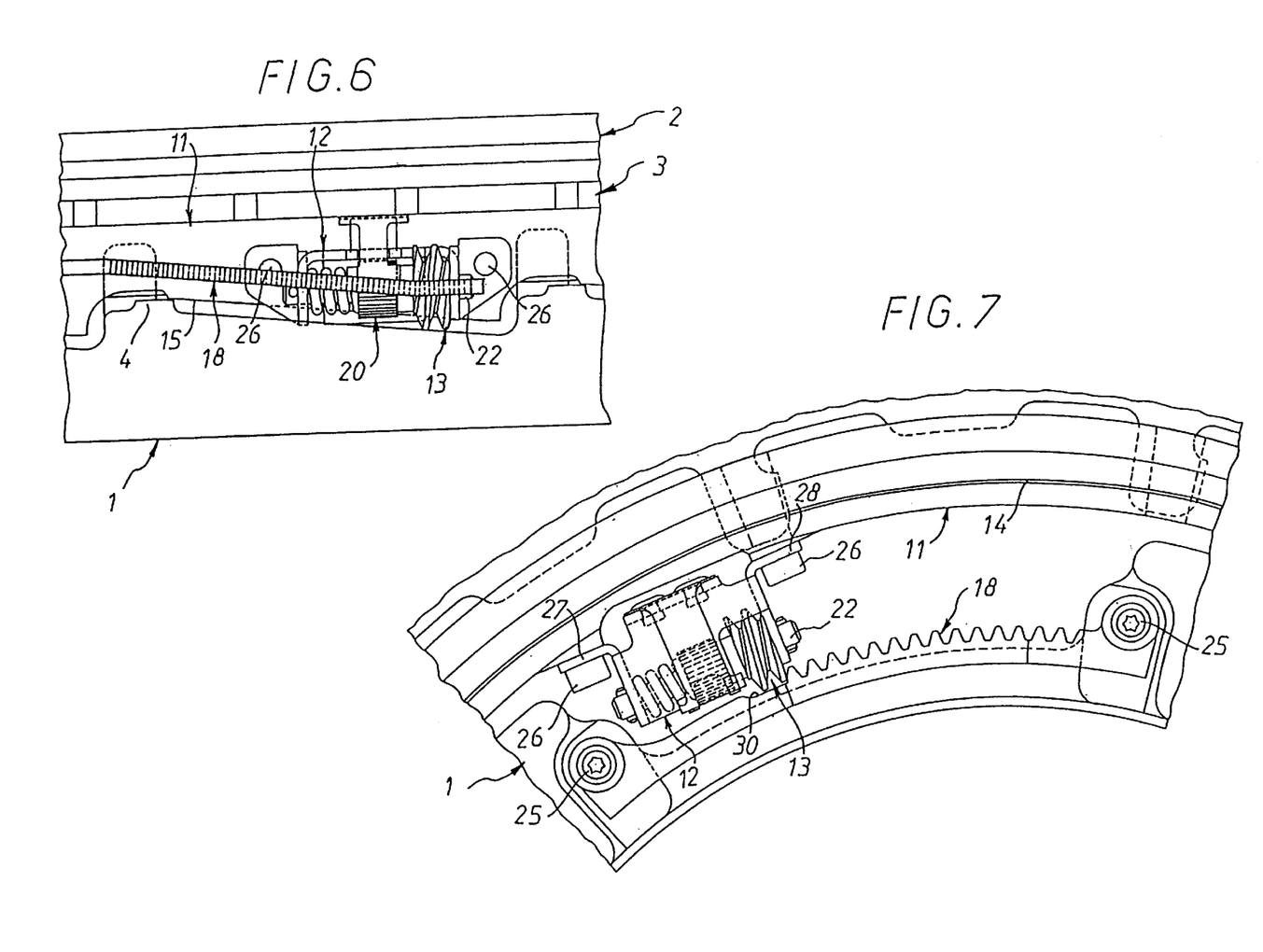
FIG. 6 is a partial view in the direction of the arrow VI in FIG. 1.
FIG. 7 is a partial view of FIG. 1 showing the clutch in the condition where the wear take-up device is no longer operational, a certain quantity of wear having been taken up.

The teeth 18, more clearly visible in FIGS. 6 and 7, are carried by a piece made of bent plate in the general shape of a flattened Z and fixed by its ends, by means of screws 25, FIG. 1, to protrusions on the thrust plate 1; these ends are disposed transversely, with respect to the axis of the clutch, whilst the inclined part which connects them is parallel to the ramps 15.

The support 12, carrying the ratchet wheel 20, the worm 13 and the helical spring 40, is fixed to the ramp means 11, for example by means of screws 26 passing through oblong holes 27A, 28A formed in its arms 27, 28, the said oblong holes 27A, 28A allowing a certain axial adjustment during installation; consequently the diaphragm 3 moves with respect to the support 12 during the disengagement and re-engagement operations; it will be understood that, by virtue of this arrangement, during the tilting of the diaphragm 3 during the re-engagement operations, the latter moves the control tongue 35 which, by cooperation with the teeth 21 on the ratchet wheel 20, is caused to make the ratchet wheel 20 rotate in the clockwise direction; on return, the elasticity of the elastic member 31 and the inclination of the teeth 21 means that the control tongue 35 moves towards the right as seen in FIGS. 2 to 5, climbing the teeth 21.

The wear take-up device which has just been described functions as follows.

FIG. 2 shows the clutch engaged, the linings on the friction disc being in the new or compensated state and clamped between the reaction plate, not shown, and the thrust plate 1. In this position, the control tongue 35 has its end at the root of a tooth on the ratchet wheel 20.

Figure 3:
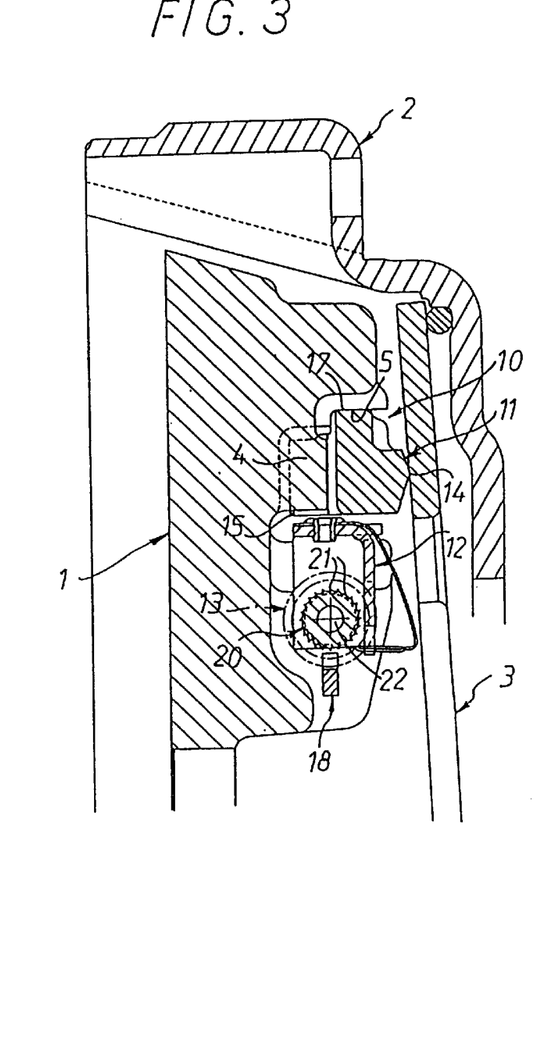
FIG. 3 is a view similar to FIG. 2, the clutch being disengaged.

When the clutch is disengaged, the diaphragm 3 tilts and, in its movement, progressively releases the control tongue 35, whose end follows the inclined ramp formed by the tooth in the root of which it was situated in the previous step; during this disengagement travel, the end of the control tongue 35 does not jump or is at the limit of jumping a tooth; this is achieved by the end 33 of the elastic member 31 coming into abutment against the support 12, or more precisely against the faces 36A, turned towards the ratchet wheel 20, of the flanks 36 of a scallop 37 formed in the web 19 of the support 12 which constitute a control stop and limit the return travel of the control tongue 35 whatever the travel of the diaphragm 3, as shown in FIG. 3, the end 33 having the shape of a T whose web moves in the scallop 37 and whose bar constitutes the control tongue 35.

Figure 4:
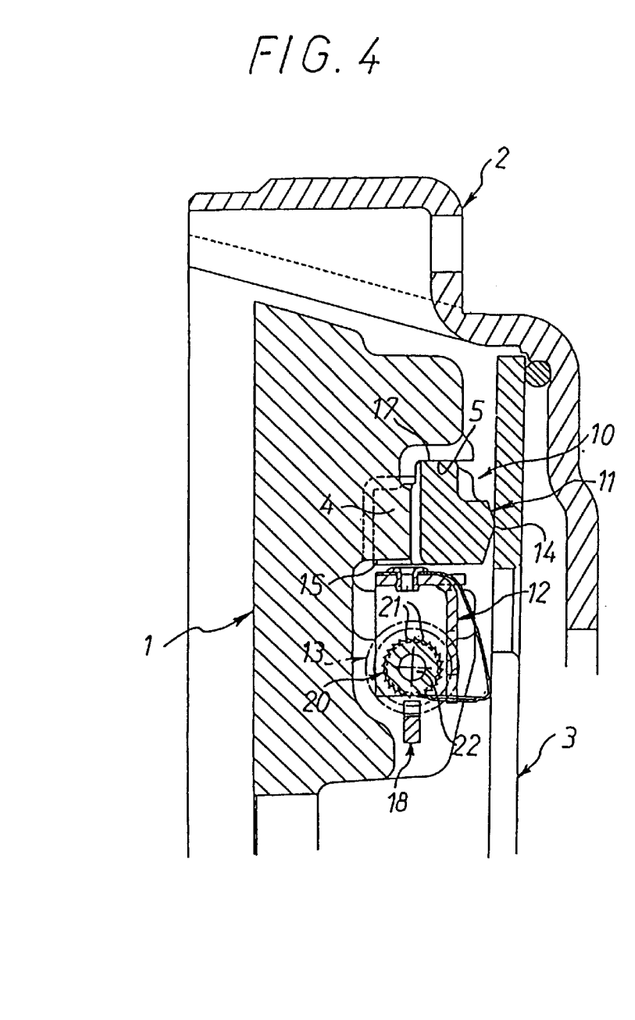
FIGS. 4 and 5 are view similar to FIGS. 2 and 3, respectively, after wear on the linings.
Figure 5:
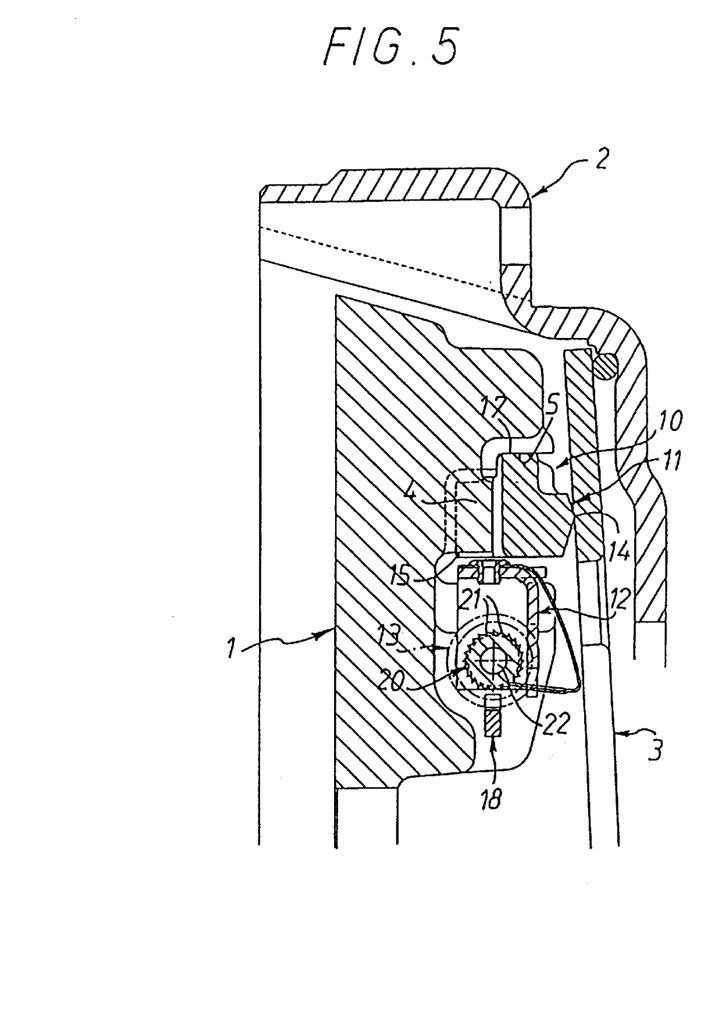

When the linings wear, as is known, the thrust plate 1, still subjected to the axial force of the diaphragm 3, moves closer to the reaction plate, which is fixed axially like the cover 2; the diaphragm 3 therefore moves closer to the reaction plate, that is to say therefore to the open end of the cover 2, driving in its movement the control tongues 35; the ratchet wheel 20 rotates about its shaft in the clockwise direction; the engaged clutch, with worn linings, is depicted in FIG. 4. This rotational driving of the ratchet wheel 20 causes the worm 13 to turn also by a small quantity on its axis; the ramp means 11 being immobilised with respect to the cover 3 under the effect of the load of the diaphragm 3, the worm 13, which meshes with the teeth 18, so to speak screws on these teeth 18, compressing the helical spring 40, the direction of the thread of the worm 18 being designed so that this is the case.

During the disengagement operation which follows the wear phase which has just been described, the thrust plate 1 releases the linings, moving away from them under the action of the tangential tongues 9 which return towards the base of the cover 2 the thrust plate 1 and the ramp means 11 in contact with the diaphragm 3 through their abutment areas 14 and with the studs 4 of the thrust plate 1 through their ramps 15. The helical spring 40 forces the worm 13 towards the flange 24 of the support 12, which it left in the wear phases, that is to say from right to left as seen in FIGS. 2 and 3; the load of the diaphragm 3 no longer being applied to the ramp means 11, the only force to be overcome in order to be able to cause these ramp means 11 to rotate with respect to the thrust plate 1 is the friction force generated by the return force of the tangential tongues; if the load of the helical spring 40 is sufficient to overcome this force, then the spring 40 bearing on the worm 13, by means here of the ratchet wheel 20, the worm 13 bearing on the teeth 18, causes the support 12, and therefore the ramp 15, to rotate: rotating on themselves, the ramps 15 of the ramp means 11, by cooperation with the studs 4 of the thrust plate 1, will move the thrust plate 1 away from the base of the cover 2, thus increasing the axial distance between the working face of the thrust plate 1 and the abutment areas 14 of the ramp means 11, thus taking up at least partly the movement of the thrust plate 1 due to the wear on the linings. The load of the helical spring 40 being a function of the quantity by which it was compressed by the worm 13 during the wear phases, it can be seen that several engagement and disengagement operations may be necessary before the wear take-up device 10 enters the take-up phase proper, this being a function of the relative sizing of the parts concerned, the load of the helical spring 40 being caused to increase with the wear on the friction linings; in FIG. 5, which corresponds to the clutch disengaged with worn linings, it has been assumed that the wear have been no take-up; it has also been assumed that the wear has been sufficient for the ratchet wheel 20 to have rotated sufficiently so that, on return, the controlled tongue 35 has jumped a tooth.

During the engagement operation, the control tongue 35, pushed by the diaphragm 3, causes the ratchet wheel 20 to turn, and the ramp means 11, not yet gripped by the diaphragm 3, rotate and take up the clearance due to the wear; at the end of the take-up operation, the diaphragm 3, the ratchet wheel 20 and the control tongue 35 regain the position which they occupied in FIG. 2.

When a clutch is equipped with a wear take-up device whose functioning is automatic, it is advantageous for the user to have an idea of the degree of wear on the friction linings; this is because, without this information, he may use his friction disc until there is almost complete wear on the linings, a situation which may result in significant degradation of the friction surfaces of the flywheel and/or the thrust plate, changing which is an expensive operation.

In order to avoid reaching this situation, in this case the length of the teeth 18 with which the worm 13 cooperates allows the latter only to effect the taking-up of a wear corresponding to only part of the thickness of the linings, for example 80% thereof; at the end of the teeth, a recess 30, visible in FIGS. 1 and 7, enables the worm 13 to disconnect, at this stage, from the teeth 18. Thus FIG. 1 shows the relative positions of the worm 13 and teeth 18 with new linings, and FIG. 7 these positions when the linings have been 80% worn, for example.

The worm 13 no longer acting on the teeth 13, the clutch functions like a clutch which is not equipped with a wear take-up device: the wear continuing, the position of the diaphragm changes in the engaged state of the clutch, with the wear, and therefore its load and the disengagement force to be provided which, as is known, increases with the wear; consequently, the user is warned and knows that he has passed the 80% wear mark.

In the variant which has just been described, the worm 13 and ratchet wheel 21 are a single piece; naturally, the worm 13 could be a separate piece provided with a bore, the said bore and the shaft itself being arranged so that the worm can slide along the shaft whilst being fixed to the said shaft with respect to rotation.

Referring to FIGS. 11 to 14, a friction clutch mechanism can be seen, notably for a motor vehicle, which comprises a thrust plate 51 intended to cooperate with a friction disc, not shown, carrying at its external periphery friction linings, which itself cooperates with a reaction plate. The reaction plate, not shown, is intended to be fixed with respect to rotation to a driving shaft, such as the crankshaft of the internal combustion engine. The friction disc is fixed with respect to rotation to a driven shaft such as the input shaft of the gearbox.

The thrust plate 51 is fixed with respect to rotation to a hollow-shaped cover 52 by means of tangential tongues 9 which, being elastic, at the same time constitute means of returning the thrust plate 51 towards the cover 52.

Figure 13:
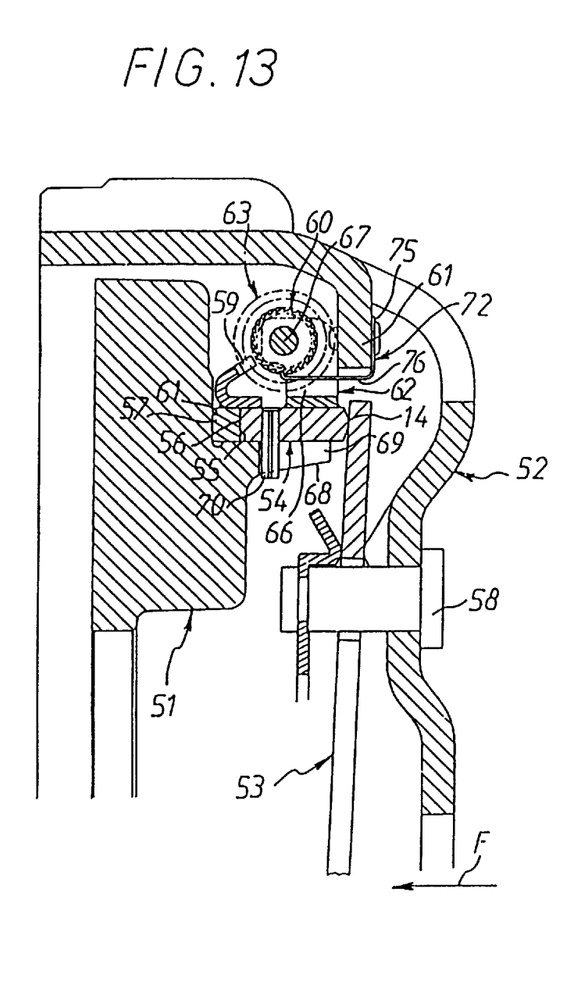
FIG. 13 is a view in section along XIII—XIII in FIG. 11.

The thrust plate 51, whilst being fixed with respect to rotation to the cover 52, is therefore able to move axially with respect to the cover 52 under the action of controlled axially acting elastic means, in this case a diaphragm 53 articulated on the cover 52 by means of small columns 58 carrying a rolled ring offering a secondary abutment for the diaphragm 53, the clutch here being of the pushed type, the disengagement operation being effected by acting on the end of the fingers of the diaphragm in the direction of the arrow F in FIG. 13.

In order, when the clutch is engaged, to keep the axially acting elastic means 53 in a position independent of the wear on the linings of the friction disc, and to c lesser extent the wear on the thrust 51 and reaction plates whose faces, referred to as friction faces, wear in contact with the linings of the disc, a wear take-up device is provided which comprises circumferentially disposed ramp means 54; more precisely, these ramp means 54 consist of an annulus having ramps 56 disposed circumferentially on its face turned towards the thrust plate 51; on its opposite face, the said annulus has the abutment area 14 consisting of a top edge disposed in an arc of a circle centred on the axis of the clutch. Naturally, the said abutment area 14 can be continuous or discontinuous.

The thrust plate 51 has, on its face turned towards the base of the cover 52, a transverse abutment face 61 with which counter-ramp means 57 cooperate in the form of an annulus carrying, on its face opposite to that which cooperates with the abutment face 61, counter-ramps 55 distributed circumferentially at a distance from each other which corresponds to that which circumferentially separates two successive ramps 56, the counter-ramps 55 being intended each to cooperate with a ramp 56.

The ramp means 54 are placed axially between the diaphragm 53 and the counter-ramp means 57 so that the counter-ramps 55 receive the ramps 56 and the diaphragm 53 cooperates with the abutment area 14, which thus constitutes the abutment means by means of which the diaphragm 53 acts on the thrust plate 51.

The external periphery of the counter-ramp means 57 is provided with teeth 59.

In this case the teeth 59 are produced from a cropped and bent plate, and attached by welding to the counter-ramp means 57.

The foot of the abutment face 61 of the thrust plate 51 is bordered by a circumferential cylindrical step 68, on the external periphery of which the counter-ramp means 57 and ramp means 54 are centred.

The step 68 has an axial scallop 69 in which there is able to move axially a pin 70 extending radially and carried by the ramp means 54: thus the latter are prevented from rotating with respect to the thrust plate 51, and therefore with respect to the counter-ramp means 57, whilst being able to move axially.

The wear take-up device also comprises a ratchet wheel 60 with inclined teeth 21 mounted so as to rotate about a shaft 67 which also carries a worm 63; the thread and pitch of the worm 63 are adapted to the teeth 59 of the counter-ramp means 57; the worm 63 is caused to cooperate with the teeth 59 under the circumstances which will be described below; in this case the teeth 59 extend radially with respect to the shaft 67.

The shaft 67 is carried rotatably by a support 62 made from cropped and bent plate, in the general shape of a U having a web 64 and two flanges 65, 66 adapted to support the shaft 67; the support 62 is fixed by its web 64, for example by welding, to the ramp means 54, at the external periphery of these, radially above the abutment area 14.

An elastic member 72, here metallic and thinner than the support, in the general shape of a straight L, comprises two flanges 75, 76, including one flange 75 for fixing, for example by riveting, the elastic member 72 to a transverse lug 61 on the cover 52, and whose other flange 76 is formed as a control tongue and here extends roughly parallel to the axis of the clutch; when the elastic member 72 and ratchet wheel 60 are mounted, the first on the cover 52 and the second on the ramp means 54, the control tongue 76 cooperates elastically with a tooth root on the ratchet wheel 60.

Around the shaft 67 there is placed a helical spring 86 constituting the elastic take-up means, as described below; here the spring 86 is placed axially between the ratchet wheel 60 and the flange 66 of the support 62.

The support 62 carrying the ratchet wheel 60, worm 63 and helical spring 86 being fixed to the ramp means 54, it moves with respect to the cover 52, therefore with respect to the control tongue 76, during the disengagement and re-engagement operations; it will be understood that, by virtue of this arrangement, during the tilting of the diaphragm 53 during the re-engagement operations, the ratchet wheel 60 moves from right to left, as seen in FIG. 13, and, by cooperation with the teeth 21 on the ratchet wheel 60, the end of the control tongue 76 is caused to make the ratchet wheel 60 rotate in the anti-clockwise direction; during disengagement, the elasticity of the elastic member 72 and the inclination of the teeth 21 mean that the control tongue 76 climbs the teeth 21.

The wear take-up device which has just been described functions as follows.

Figures 11, 12:
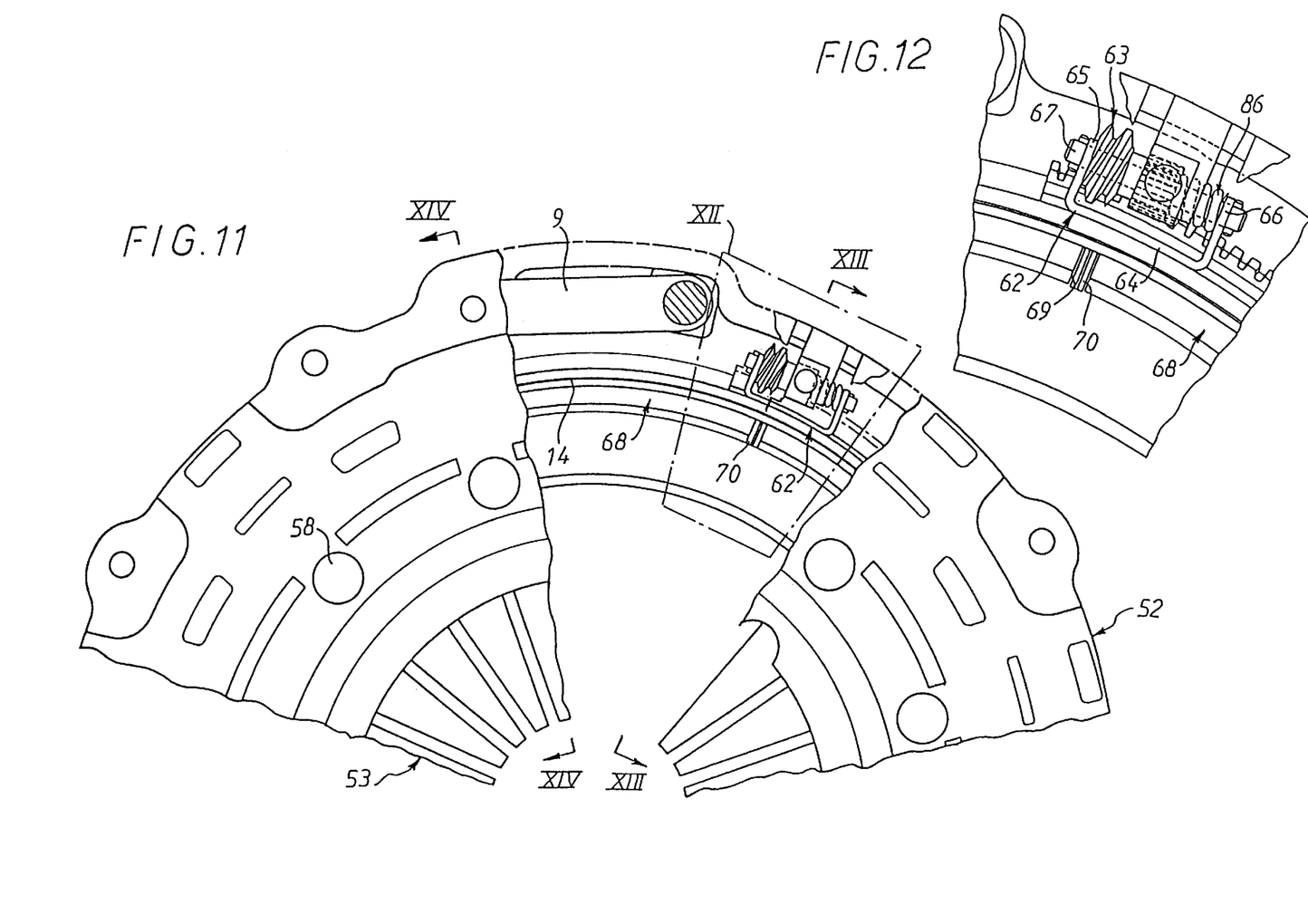
FIG. 11 is a view similar to FIG. 1 showing a clutch equipped with a variant of the wear take-up device according to the invention.
FIG. 12 is an enlarged view of the magnification XII in FIG. 11.
Figure 14:
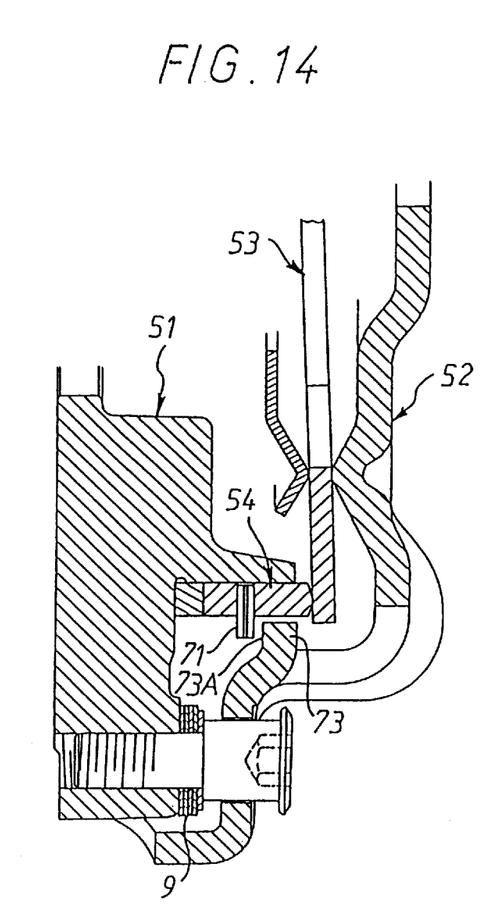
FIG. 14 is a view in section along XIV—XIV in FIG. 11.

FIGS. 11 and 14 depict the clutch engaged, the linings of the friction disc being in the new state and clamped between the reaction plate, not shown, and the thrust plate 51. In this position, the control tongue 76 has its end at the root of a tooth on the ratchet wheel 60.

When the clutch is disengaged, the end of the fingers of the diaphragm 53 is forced in the direction of the arrow F, moving away from the base of the cover 52; the diaphragm 53 tilts around the small columns 58; in its movement, the external periphery of the diaphragm 53 progressively releases the thrust plate 51, which drives the ratchet wheel 60 towards the base of the cover 52, which moves in front of the control tongue 76, whose end follows the inclined ramp consisting of the tooth in the root of which it was situated in the previous step, the teeth 21 on the ratchet wheel 60 being produced so that, during this disengagement travel with new linings, the end of the control tongue 76 does not jump a tooth; this is achieved by a control stop 71 coming into abutment against a counter-stop 73 of the cover 52; here, the control stop 71 is produced by a pin carried by the ramp means 54 and adapted to cooperate in abutment with the face 73A, turned towards the thrust plate, of a lug 73 on the cover obtained by cropping and bending.

When the linings wear, as is known, the thrust plate 51, still subjected to the axial force of the diaphragm 53, moves closer to the reaction plate, which is fixed axially like the cover 52; the ratchet wheel 60 therefore moves closer to the reaction plate, therefore moving away from the control tongue 76, which holds the tooth 21 with which it cooperates in the tooth root; the ratchet wheel 60 therefore rotates about its shaft in the anti-clockwise direction; this driving of the ratchet wheel 60 in rotation causes the worm 63 also to rotate on its shaft; the counter-ramp means 57 being immobilised with respect to rotation under the effect of the load of the diaphragm 53, the worm 63, which meshes with the teeth 59 on the counter-ramp means 57, so to speak screws on these teeth 59, compressing the helical spring 86, the direction of the thread on the worm 63 being designed so that this is the case.

During the disengagement operation which follows the wear phase which has just been described, the thrust plate 51 releases the linings, moving away from them under the action of the tangential tongues 9, which return, towards the base of the cover 52, the thrust plate 51 and the ramp means 54 in contact with the diaphragm 53 through their abutment areas 14 and with the counter-ramps 55 through their ramps 56. The helical spring 86 forces the worm 63 towards the flange 65 of the support 62, away from which it has moved in the wear phases, that is to say from right to left as seen in FIGS. 9 and 10; the load of the diaphragm 53 no longer being applied to the ramp means 54, the only force to be overcome in order to be able to cause the counter-ramp means 55 to rotate with respect to the thrust plate 51 is the return force of the tangential tongues 9; if the load of the helical spring 86 is sufficient to overcome this force, then the spring 86 moves the worm 63, which is prevented from rotating on itself by the pressure of the control tongue 76 and which will drive the teeth 59: in rotating on themselves the counter-ramps 55, by cooperation with the relatively fixed ramps 56, will move the thrust plate 51 away from the base of the cover 52, thus increasing the axial distance between the working face of the thrust plate 51 and the abutment areas 4 of the ramp means 54, thus at least partly taking up the clearance due to the wear on the linings. The load of the helical spring 86 being a function of the quantity by which it has been compressed by the worm 63 during the wear phases, it can be seen that several engagement and disengagement operations may be necessary before the wear take-up device enters the take-up phase proper, this being a function of the relative sizing of the parts concerned.

If the wear has been sufficient for the ratchet wheel 60 to have rotated sufficiently for, on return, the control tongues 76 to jump a tooth, during the engagement operation, the control tongue 76 causes the ratchet wheel 60 to rotate and the counter-ramp means 57, not yet gripped by the diaphragm 53, rotate and take up the wear; at the end of the take-up operation, the diaphragm 53, the ratchet wheel 60 and the control tongue 76 regain their position which they occupied in FIG. 11.

The worm 63 and ratchet wheel 60 being cut from a single piece, as can be seen, the support 62 equipped with this same piece, the spring 86, the shaft 67 and the ramp means 54 constitute a subassembly ready to be installed.

What is claimed is:

1. Friction clutch of the type having a reaction plate (102), a friction disc (100) carrying friction linings (101) at its external periphery, a thrust plate (1, 51), a cover (2, 52) fixed to the reaction plate, axially acting elastic means (3, 53) acting between on the one hand the cover (2, 52) and on the hand the thrust plate (1, 51) by means of abutment means (14), the thrust plate (1, 51) being fixed with respect to rotation to the cover (2, 52) whilst being able to move axially with respect to it and being subjected to the action of elastic return means (9) returning the thrust plate (1, 51) axially towards the cover (2, 52), the said clutch also having a wear take-up device comprising circumferentially disposed ramp means (11, 54), placed axially between the abutment means (14) and the thrust plate (1, 51), the said ramps (15, 56) being adapted to cooperate with counter-ramp means (4, 57), the said wear take-up device also comprising teeth (18, 59) with which a tangentially disposed worm (13, 63) cooperates, one of the two members, the ramp means (11, 54) and the counter-ramp means (4, 57), being fixed to the said teeth (18, 59), means (20, 60) for rotatably driving the worm (13, 63) being provided, made operational by the wear on the friction linings when the clutch is engaged, the worm (13, 63) and the means (20, 60) of rotatably driving the worm (13, 63) being carried by a support (12, 62), characterised by the fact that the said support (12, 62) is fixed to the ramp means (11, 24).

2. Friction clutch according to claim 1, characterised by the fact that the axially acting elastic means (3, 53) consists of a diaphragm.

3. Friction clutch according to claim 1, characterised by the fact that the ramp means (11, 54) consist of an annulus having axially, on one side circumferentially distributed inclined ramps (15, 56) and on the other side the abutment means (14).

4. Friction clutch according to claim 3, characterised by the fact that the counter-ramp means consists of studs (4) or ramps (27) intended to cooperate with the ramps (15, 56) of the ramp means (11, 56).

5. Friction clutch according to claim 1, characterised by the fact that the ramp means (11, 54) are centred with respect to the thrust plate (1, 51).

6. Friction clutch according to claim 1, characterised by the fact that the worm (13, 63) is mounted so as to be able to move along its shaft whilst being subjected to the action of an elastic so-called take-up means (40, 86).

7. Friction clutch according to claim 6, characterised by the fact that the travel of the thrust plate (51) is limited in the direction of disengagement.

8. Friction clutch according to claim 7, characterised by the fact that the elastic take-up means (40, 86) is a helical spring surrounding a shaft (22, 67) which carries the worm (13, 63).

9. Friction clutch according to claim 8, characterised by the fact that the means (20) of driving the worm (13, 63) in rotation consist of a ratchet wheel integral in rotation with the worm (13, 63).

10. Friction clutch according to claim 9, characterised by the fact that the shaft (22, 67) carrying the worm (13, 63) and the helical spring (40, 86) is supported by the support (12, 62).

11. Friction clutch according to claim 1, characterised by the fact that the means (20, 60) of driving the worm (16, 63) in rotation are controlled by means of a control tongue (35, 76).

12. Friction clutch according to claim 11, characterised by the fact that the travel of the control tongue (35, 76) with respect to the ratchet wheel (20, 60), during the disengagement operation, is limited by a so-called control stop (36A).

13. Friction clutch according to claim 12, characterised by the fact that the worm (13, 63) and ratchet wheel (20, 60) are cut from the same piece.

14. Friction clutch according to claim 13, characterised by the fact that the teeth (21) of the ratchet wheel (20, 60) are produced so that, during a minimum disengagement travel defined by design, and disregarding the control stop (36, 73), the end of the control tongue (35, 76) jumps a tooth.

15. Friction clutch according to claim 14, characterised by the fact that the teeth (21) on the ratchet wheel (20, 60) are produced so that, during the disengagement travel with new linings, the end of the control tongue (35, 76) does not jump or is at limit of jumping a tooth.

16. Friction clutch according to claim 1, characterised by the fact that the counter-ramp means (4) and the teeth (18) are fixed to the thrust plate (1), the ramp means (11) being free to rotate.

17. Friction clutch according to claim 16, characterised by the fact that the support (12), carrying the worm (13) and the means (20) of driving the worm (13) in rotation, is fixed to the ramp means (11) radially below the latter.

18. Friction clutch according to claim 16, characterised by the fact that the teeth (18) are placed radially below the worm (13) with which they cooperate.

19. Friction clutch according to claim 16, characterised by the fact that the control tongue (35) is carried by the support (12).

20. Friction clutch according to claim 16, characterised by the fact that the means (20) of driving the worm (13) in rotation are controlled by the diaphragm (3).

21. Friction clutch according to claim 20, characterised by the fact that the support (12) equipped with the worm (13), with the ratchet wheel (20), with the control tongue (35), with the spring (40) and with the shaft (22) constitutes a subassembly ready to be installed.

22. Friction clutch according to claim 1, characterised by the fact that the ramp means (54) are integral in rotation with the thrust plate (52) whilst being able to move axially with respect to it, whilst the counter-ramp means (57) are produced in the form of an annulus disposed axially between it and the ramp means (54).

23. Friction clutch according to claim 22, characterised by the fact that the said annulus is mounted so as to rotate freely with respect to the thrust plate (52).

24. Friction clutch according to claim 23, characterised by the fact that the teeth (59) are carried by the counter-ramp means (57).

25. Friction clutch according to claim 24, characterised by the fact that the support (62) carrying the worm (63) and the means (60) of driving the worm (63) in rotation is fixed to the ramp means (54) radially below them.

26. Friction clutch according to claim 24, characterised by the fact that the teeth (59) are placed radially above the counter-ramp means (57).

27. Friction clutch according to claim 24, characterised by the fact that the control tongue (76) is carried by the cover (52) and by the fact that the support (62) equipped with the worm (63), with the ratchet wheel (60), with the spring (86) and with the shaft (67) constitutes a subassembly ready to be installed.

28. Friction clutch according to claim 24, characterised by the fact that the clutch is of the pushed type, the diaphragm (53) being fixed to the cover by means of small columns (58).

* * * * *